United States Patent Office 3,015,639
Patented Jan. 2, 1962

3,015,639
WATER BASE DISPERSIONS OF SHELLAC SOAPS AND POLYEPOXIDES AND METHOD FOR THE PREPARATION OF SUCH DISPERSIONS
Herbert S. Cockeram, New York, N.Y., assignor to Gillespie-Rogers-Pyatt Co., New York, N.Y., a corporation of Delaware
No Drawing. Filed Nov. 9, 1959, Ser. No. 851,534
18 Claims. (Cl. 260—25)

This invention relates to water base dispersions of shellac soaps and polyepoxides and to a method for the preparation of such dispersions. More particularly, the invention is concerned with water base dispersions of polyepoxide bodies, employing a shellac soap, thereby giving the dispersions particular value and usefulness in the preparation of coating and finishing compositions, adhesives, binders and impregnants for layers or bundles of sheets and fibers.

Aqueous dispersions of shellac soap have been employed as a minor ingredient in water base coating systems, for example, as the leveling and anti-slip agent in wax and polymer emulsions. Aqueous shellac soap dispersions are also used to impregnate felt hat bodies to impart stiffness. Systems where shellac soap makes up a major proportion of the non-volatile solids have limited specialized applications, as for example, in coatings for playing cards, paper, leather and other surfaces, and as binders for inks.

However, all such coatings and impregnated manufactures are more or less brittle, and lacking in durability, adhesion, mar-resistance, toughness, water-resistance and flexibility. Moreover, when such coatings are baked to improve their hardness and water-resistance, they become extremely brittle and lose their power to adhere to the substrate to which they are applied. They also "yellow" badly, or darken in color, when heated.

It is an object of this invention to provide a water base finishing and dressing composition of general application.

It is a further object to provide a water base system combining the excellent physical properties of certain resins, particularly shellac, and of polyepoxides.

It is a further object to provide water base dispersions useful as permanent and temporary adhesives for materials such as wood, metal, rubber, leather, metal-foils, paper and the like.

It is a further object to provide novel water base dispersions useful in the fields of sizing, painting and printing.

Other objects will be apparent from the following detailed description.

The invention, accordingly, is embodied in certain novel water base dispersions of polyepoxide bodies with shellac soaps, and polyepoxide bodies with certain other resin soaps and gum soaps which can be prepared with remarkable ease and which yield very hard, tough and resilient coatings when used for coating application. Fundamentally, the compositions comprising this invention are characteristically composed of a dispersion of the shellac soap, or other resin or gum soap, in water, to which a polyepoxide body or mixture of polyepoxide bodies is added with stirring, thereby to disperse or emulsify them in the aqueous shellac soap medium. The ratio of polyepoxide to shellac soap affects the properties of the coating obtained from the dispersions and, accordingly, a range from a portion of 1 percent up to about 50 percent polyepoxide composition based on the weight of the total amount of non-volatile solids in the emulsion gives coatings which are hard and tough and in the higher ranges from 50 percent to about 90 percent polyepoxide may be made actually permanently sticky and adherent.

I have found, in accordance with this invention, that through the means of the polyepoxide dispersion in the water base, the desirable properties of the polyepoxide bodies as a class, may be developed in coatings and adhesives without the use of expensive organic solvents which must generally be used with these materials. That is, the polyepoxide body in solution and in the presence of suitable curing agents and applied to surfaces as a lacquer, makes a coating material. However, its usefulness is limited by the fact that it is expensive itself and it requires also, the use of curing agents and quite expensive solvents. This invention, therefore, makes the polyepoxide bodies useful in water bases through the means of a shellac soap or resin soap dispersing agent. The invention also provides a means of obtaining the valuable properties of the shellac, or other resin used to form the soap, in the coating or in the end product obtained without resorting to dissolving the shellac, or other resin or gum, in alcohol, or in some other relatively expensive solvent.

This invention embraces compositions prepared in a water base, without organic solvents, and does not contemplate hot-melt compositions or mixing of powders in the dry state or otherwise mixing or compounding in the absence of water. Water is an essential ingredient of the composition as the base.

The invention embraces, as one component, shellac soaps, or shellac salts, as they are sometimes described. These soaps or salts are not acid, but are substantially neutral or slightly alkaline. The pH of shellac soap, and other such resin soaps dispersed in water ranges from 6.5–7.5, in most cases. In the case of some synthetic resins, a stable dispersion has a pH of about 8.0–9.0.

The invention, accordingly, comprises preparing an aqueous dispersion of a shellac soap, or other resin soap, and incorporating therein by ordinary power stirring a polyepoxide or mixture of polyepoxides, which are generally identified as glycidyl polyethers of polyhydric phenols having terminal epoxy groups, epoxy equivalence greater than 1.0 and molecular weight of about 300 to 1500. Thus, the term polyepoxide as used herein is intended to include epoxy resins, also known as ethoxyline resins, and polyepoxy bodies having two or more epoxy groups

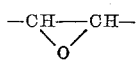

The polyepoxides may be monomeric or polymeric. For the preparation and chemistry of polyepoxides, and epoxy and ethoxyline resins, the references given herein provide ample fundamental information. Specific examples of polyepoxides suitable for the practice of this invention are: "Shell Chemical Company ("Epon 812"), ("Epon 828"); Dow Chemical Company "DER 332"; Ciba Company "Araldite" resins; "Bakelite" brand epoxy resins; "Cardolite" epoxy resins of the Irvington Varnish Company, which are based on cashew-nut liquid; "Epoxide 201" of Union Carbide Company, which is 3,4-epoxy-6-methylcyclohexylmethyl - 3,4-epoxy-6-methylcyclohexanecarboxylate; and those named in United States Patent 2,872,427, Schroeder.

Polyepoxides are insoluble in water. An outstanding deficiency of polyepoxides is that in order to develop ultimate film properties, a suitable converter or curing agent must be incorporated in the polyepoxide body. Such curing agents include polyamines, acids, acid anhydrides, Lewis acids, and the like. (See "Epoxy Resins," by Lee and Neville; McGraw Hill, New York (1957).) United States Patent 2,872,427, Schroeder, February 3, 1959, describes polyepoxide emulsions in which are incorporated acid curing agents. This is accomplished by employing non-ionic, acid-stable emulsifying agents to stabilize the emulsions in the presence of the necessary acidic curing agents.

The dispersions made in accordance with this invention contain neither acid curing agents nor acid-stable emulsifying agents. The dispersions are in fact decomposed or "broken" by addition of acid.

United States Patent 2,769,739, Flowers and Holmberg, November 6, 1956, describes novel resinous compositions useful for laminating and insulating compositions. These compositions, ranging from 10–90 percent natural shellac and from 90–10 percent ethoxyline resin in the form of a reaction product, are indicated to be useful for hot-melt impregnating without the use of organic solvents, or as organic solvent solutions or varnishes for dip-impregnation; or as the bonding resin in molding compositions, and for casting resins with or without fillers.

Shellac resin, whether bleached or unbleached, is an alcohol-soluble resin of acid number about 65–95. It is insoluble in water. An alcohol solution of shellac has a pH of 2.5–4.5. Other water dispersible resins, such as Manila gum, rosin, and many synthetic resins have acid numbers ranging from 30–300 and are insoluble in water. Shellac, such synthetic resins and Manila gum are useful in accordance with this invention for forming the soap which is useful as the dispersing agent for the epoxide bodies.

The term shellac soap or shellac salt refers to the substantially neutral or slightly alkaline reaction product of natural or synthetic shellac with an alkali or mixture of alkalies. The shellac used in preparing the salt may be orange, that is, unbleached; or it may be bleached. Other suitable varieties include seedlac, flake shellac, button lac, spray dried lac, garnet lac, machine-made lac or other commercial grade, as Kusmi #2, Lemon #1, Superfine, TN, Blonde, with or without the naturally occurring shellac wax, and may be partially processed, that is, dewaxed without bleaching, or decolorized by means of carbon-black. The shellac may be bleached by known methods, or partially bleached, and may or may not be dewaxed, or may have wax added to it over and above the proportion of shellac wax naturally occurring in it. Bleached dewaxed shellac is known as "Refined" shellac. Bleached shellac containing wax is known as "Regular" shellac. Dried shellac soap described in United States Patent 2,834,770 of Kalkhof-Rose, May 13, 1958, entitled: "Water-Soluble Shellac Powder," may also be used. Other suitable resins useful for making soaps for the polyepoxide dispersion are Manila gum, rosin, maleic and fumaric acid reaction products with rosin, polyols and the like and other synthetic resins which forms soaps with alkalies, such as Shanco L–1032 of Shanco Chemical Co., and Waterez 1582 of Reichhold Chemical Co. In general the suitable synthetic resins are those having acid numbers in the range from 30–300.

Chemically, shellac is a mixture of polyhydroxy polycarboxylic acids whose exact structure is unknown. It is described fully in "Protective and Decorative Coatings," vol. I, John Wiley & Sons, Inc., New York (1941), pages 259–291. Shellac reacts with alkalies much as do fatty acids in that the reaction product is a soap. Thus, the shellac-ammonia reaction product bears the same relation to the parent acidic shellac resin as, for example, ammonium stearate bears to stearic acid. Shellac reacts with, and may be dispersed in water by alkalies and alkaline salts, such as borax, alkali metal hydroxides, carbonates, bicarbonates and sulfites, ammonia, and organic alkalies, such as ethyl amine, triethanolamine, morpholine, 2-amino-2-methyl-1-propanol, pyridine, and in general, with all organic amines which are soluble in water. Other resins which form aqueous dispersions are analogous in their chemical functions.

The shellac soap is prepared by stirring and warming together water, shellac, and an alkali. The amount of alkali required is calculated from the acid number of the shellac (or resin used) and the equivalent weight of the alkali, but may be slightly more or slightly less than this amount, without departing from the substance of the invention. The solids content, that is, the shellac soap, or other resin soap, content of the resulting dispersion may be varied from 5 percent upwards to about 80 percent, but I prefer the range 20–40 percent as being most easily workable. Above 40 percent, many shellac soap and resin soap dispersions become excessively viscous. The dispersion may be below, at or above ordinary room temperature when the polyepoxide is added. I prefer the range between room temperature and about 80–90° C.

The polyepoxide is added slowly with stirring to the water base shellac soap dispersion. The polyepoxide may be below, at, or above room temperature. If the mixture becomes excessively viscous during the addition, water may be added in sufficient quantity to maintain fluidity. However, an emulsion or dispersion forms easily and rapidly in most cases. Clear or opaque polyepoxide dispersions may be produced, depending on the proportions of shellac soap and polyepoxide, on the specific polyepoxides employed, and on the specific alkali employed. Alternatively, the resin or shellac and polyepoxide may be stirred and suspended in the water, and the alkali added, all at once or in portions as the shellac or resin and alkali react.

It is not essential, but it may be desirable in some cases, in order to aid the formation of the dispersion or emulsion, to incorporate a dispersing agent in either the shellac soap dispersion or in the polyepoxide, or in both, before mixing the two ingredients together. In general, however, such agents reduce the hardness, water-resistance and adhesiveness of the films and coatings obtained.

Anionic dispersing agents, such as "Aerosol OT" may be employed. This is an aqueous solution of sodium dioctyl sulfosuccinate manufactured by American Cyanamid Company. Nonionic dispersing agents may also be used, such as one or more of the "Igepals." The name "Igepal" represents a series of polyoxyethylated nonylphenols manufactured by Antara Chemical Company. Many other anionic and nonionic dispersing agents may be employed alternatively.

It is a simple dispersion or emulsion which is produced at this point, since no substantial rise or fall in temperature is detected with the preparation. However, since some of the experimental emulsions gelled on standing at room temperature in from 48 hours to 21 days, possibly some of the polyepoxides react with shellac soap, or resin soap, even at room temperature and in the presence of water.

These dispersions and emulsions may be applied in a uniform manner to various substrates, as by spraying or dipping, or by roller or doctor blade. When allowed to dry in air at room temperature to eliminate the water, a continuous coating is formed, which may be opaque or clear, dull or glossy, hard or soft, firm or tacky, depending on the ratio of the non-volatile ingredients and the specific polyepoxides employed. When these coatings on tin plates, for example, are baked at about 150° C. for 10 minutes, opaque films may become clear or remain opaque, dull films may become glossy or remain dull, and so on. These phenomena are apparently also functions of the ratio of non-volatile ingredients and the specific polyepoxides employed. Evidently, chemical reactions occur between the shellac soap and the polyepoxide, which are difficult to explain because of the unknown structure of some resin soaps and shellac soap in particular. The character of the air-dried and baked films is also affected by the specific alkali employed to prepare the shellac soap.

In these dispersions the proportion of polyepoxide may range from about 5 to about 90 percent of the total solids. Various modifiers known to those skilled in the art may be incorporated, such as hardeners, plasticizers, flow-control agents, thickeners and the like, e.g., fatty acids and polymerized fatty acids, soaps of fatty acids and of polymerized fatty acids, polyvinyl alcohol, dibutyl phthalate, carboxymethyl cellulose, clays, pigments, dyes and the like.

To illustrate the manner in which the invention may be carried out, the following examples are given. It is to be understood, however, that the examples are for the purpose of illustration and the invention is not to be regarded as limited to any of the specific materials or conditions recited herein:

*Example I*

A shellac soap dispersion is prepared as follows:

| | Grams |
|---|---|
| Dewaxed bleached shellac | 350 |
| Aqua ammonia, 26° Bé | 25 |
| Water | 350 |

The above ingredients were mixed, stirred and heated in a vessel immersed in a steam-bath at 85–90° C. until a homogeneous dispersion resulted. Then 350 grams of "Shell Epon 828," a liquid ethoxylene resin having an epoxy value of 1.7–2.1, preheated to 85–90° C. was poured into the hot shellac soap dispersion with stirring. When the components were completely homogeneous, 100 grams of hot water at 85–90° C. was added with stirring. The vessel was removed from the steam bath and the emulsion allowed to cool to room temperature with stirring. A white, opaque emulsion resulted, which had a shelf stability of 21 days.

A film poured on tin-plate dried clear, and when baked for 10 minutes at 150° C., the film could be bent over a ⅛″ mandrel without cracking; it is hard, tough and mar-resistant.

*Example II*

A shellac soap dispersion was prepared as in Example I, using:

| | Grams |
|---|---|
| Dewaxed bleached shellac | 350 |
| Aqua ammonia, 26° Bé | 25 |
| Water | 250 |

"Shell Epon 828" was premixed with 2-amino-2-methyl-1-propanol in the proportions: 35 grams of the alkali and 350 grams of the epoxy resin, and the epoxy mixture added to the shellac dispersion. The result was an emulsion similar to that obtained in Example I. It had a shelf-stability of 16 days. Its baked film had water resistance superior to that of Example I.

*Example III*

| | | |
|---|---|---|
| Dewaxed bleached shellac | grams | 225 |
| Aqua ammonia, 26° Bé | milliliters | 63 |
| Water | grams | 500 |

The above ingredients were mixed, stirred and dissolved at 60–70° C. and then allowed to cool to room temperature. To this shellac soap dispersion was added with vigorous agitation 225 grams of "Shell Epon 828." A stable emulsion formed.

A film on tin-plate dried to a glossy coating, which, when baked for 10 minutes at 150° C. was tough and adherent, and did not crack when bent over a ⅛″ mandrel.

*Example IV*

| | Grams |
|---|---|
| Dewaxed bleached shellac | 1000 |
| Morpholine | 130 |
| Water | 2870 |

These ingredients were mixed, stirred and heated together as in Example III and allowed to cool to room temperature.

To 330 grams of this shellac soap dispersion was added 80 grams of a commercial ethoxyline resin emulsion, known as "Epi-rez 2051," and manufactured by the Jones-Dabney Company. It is a 65 percent solids emulsion containing no organic solvents. The non-volatile resin portion is said by the manufacturer to be a pure ethoxyline resin.

The mixture was shaken vigorously and an emulsion formed. After the bubbles had broken, a film was poured on tin-plate. After drying in air for 30 minutes, the film was cloudy, semi-glossy, and slightly tacky. The film was then baked for 10 minutes at 150° C., when it became clear, glossy and hard, and could be bent over a ⅛″ mandrel without cracking. The ethoxyline:shellac soap ratio is approximately 5:9.

In contrast, a film of the "Epi-rez 2051" emulsion alone, baked similarly, is clear, but remains permanently tacky.

*Example V*

To 330 grams of the shellac soap of Example IV was added 80 grams of "Epi-rez 2051" and 260 grams of a 20 percent solution of "DuPont Elvanol 50–15," a polyvinyl alcohol. The ingredients were mixed at room temperature, and a film was poured on tin-plate. After drying in air for 30 minutes the film was smooth, cloudy and dull. After a 10-minute bake at 150° C. the film was smooth, clear, glossy and permanently tacky. The ratio of solid components is ethoxyline resin:shellac soap:polyvinyl alcohol 3:6:1.

*Example VI*

| | Grams |
|---|---|
| Bleached bonedry shellac | 300 |
| 2-amino-2-methyl-1-propanol | 40.5 |
| Water | 794.5 |

The above ingredients were mixed, stirred and heated as in Example III to form a shellac soap dispersion. To 670 grams of this dispersion, cooled to room temperature, was added at room temperature 200 grams of "Epoxide 201." The mixture became more viscous than either of the components. 130 grams of water was stirred into the resulting opaque emulsion to reduce the viscosity to brushable consistency.

An air-dried film was slightly cloudy, soft, and tacky. On baking for 10 minutes at 150° C. it became clear, glossy, hard and flexible.

*Example VII*

A dispersion of Manila gum is prepared as follows:

| | Grams |
|---|---|
| Manila gum | 35 |
| Aqua ammonia 26° Bé | 4 |
| Morpholine | 4 |
| Triethanolamine | 4 |
| Water | 150 |

The above ingredients were mixed, stirred and heated together at 145–150° C. for 30 minutes. A slightly turbid dispersion resulted, with a sediment of dirt and insoluble resin. The sediment was strained off and the dispersion cooled.

To 50 gm. of the above dispersion was added 1 gm. of "Shell Epon 828." A smooth opaque emulsion formed. The resin soap:polyepoxide ratio is about 9:1–12:1. The emulsion, poured on a tin plate, dries in air at room temperature to a clear, glossy film which is harder and more mar-resistant than a film from the Manila dispersion alone. After baking at 150° C. for 10 minutes, the resin:polyepoxide film has improved mar-resistance and less tendency to "powder" when rubbed, than the baked Manila film alone.

*Example VIII*

A dispersion of "Waterez 1582" a synthetic water-dispersible resin manufactured by Reichhold Chemicals, Inc., having an acid number of 190–210 and a melting point of 118–125° C., was prepared as follows:

| | Grams |
|---|---|
| "Waterez 1582" | 50 |
| Aqua ammonia 26° Bé | 18 |
| Water | 160 |

The above ingredients were mixed, stirred and heated at 130° F. until dissolved. A clear, deep yellow dispersion resulted. When cooled, 50 gm. of the dispersion and 11 gm. of "Shell Epon 828" were stirred together and allowed to stand. The smooth emulsion first formed separated on standing overnight and the pasty material which settled out gradually became rubbery and then hard.

*Example IX*

A dispersion of "Shanco L–1032," a synthetic water-dispersible resin manufactured by Shanco Plastics & Chemicals Co., having an acid number of 100–110 and a melting point of 95–105° C., was prepared as follows:

| | Grams |
|---|---|
| "Shanco L–1032" | 50 |
| Aqua ammonia 26° Bé | 9 |
| Water | 123 |

The above ingredients were mixed, stirred and heated at 140–145° F. until the resin was completely dissolved. A clear, pale yellow dispersion resulted. When cooled, 50 gm. of the dispersion and 14 gm. of "Shell Epon 828" were stirred together. A stable opaque emulsion formed. A film was poured on tin plate and dried at room temperature. The film was clear, glossy and tacky. When baked at 150° C. for 10 minutes, it became clear, glossy and hard, and was flexible enough to be bent over a 1/8" mandrel without cracking. The resin soap: polyepoxide ratio is about 3:2.

What is claimed is:

1. A water dispersion comprising an aqueous base, a material selected from the group consisting of shellac soaps, Manila gum soap, and soap of a synthetic resin having an acid number in the range from about 30 to about 300 dissolved therein, a polyepoxide body dispersed in said aqueous solution, the amount of the polyepoxide body in relation to the said soap being in a weight ratio of about 1:100 to about 10:1.

2. A water dispersion as defined in claim 1, wherein the polyepoxide is a glycidyl polyether of a polyhydric phenol having the epoxy groups in terminal positions and having an epoxy equivalency greater than 1.0 and an average molecular weight between 300 and 1500.

3. A water dispersion as defined in claim 1, wherein the polyepoxide is a glycidyl polyether of a polyhydric alcohol.

4. A water dispersion as defined in claim 1, wherein the polyepoxide is a glycidyl ether of a novalac resin obtained by condensing an aldehyde or a ketone with a phenol.

5. A water dispersion as defined in claim 1, wherein the polyepoxide is a polymer of an epoxy-containing ethylenically unsaturated monomer formed by addition polymerization through the ethylene group.

6. A water dispersion as defined in claim 1, wherein the polyepoxide has at least one alicyclic group.

7. A water dispersion as defined in claim 1, wherein the polyepoxide has two hydroxyaryl groups separated by an aliphatic chain of at least six carbon atoms in the chain, and with the aliphatic chain being attached by carbon-to-carbon bonding to nuclear carbon atoms of the hydroxyaryl groups.

8. A water dispersion as defined in claim 1, wherein the pH of the dispersion is 6.5 or above.

9. A water dispersion as defined in claim 1, wherein the shellac soap is derived from an inorganic alkali.

10. A water dispersion as defined in claim 1, wherein the shellac soap is derived from an organic alkali.

11. A water dispersion as defined in claim 1, wherein the shellac soap is derived from an unbleached shellac containing naturally occurring shellac wax.

12. A water dispersion, as defined in claim 1, wherein the shellac soap is derived from decolorized shellac containing naturally occurring shellac wax.

13. A water dispersion, as defined in claim 1, wherein the shellac soap is derived from an unbleached shellac containing substantially no wax.

14. A water dispersion, as defined in claim 1, wherein the shellac soap is derived from decolorized shellac containing substantially no wax.

15. A water dispersion, as defined in claim 1, wherein the shellac soap is derived from decolorized shellac, containing added wax over and above the naturally occurring shellac wax.

16. A water dispersion, as defined in claim 1, wherein the shellac soap is derived from an aqueous dispersion of water-soluble shellac.

17. A water dispersion, as defined in claim 1, wherein the resin soap is derived from a resin of acid value between 30 and 300.

18. The method of preparing an aqueous dispersion of a polyepoxide body which comprises dissolving in a water base a soap selected from the group consisting of shellac soap, Manila gum soap, and soap of a resin having an acid number in the range 30–300, and mixing said base with a polyepoxide body at ambient temperature until an emulsion is formed.

References Cited in the file of this patent

UNITED STATES PATENTS

| 2,623,026 | Bagley | Dec. 23, 1952 |
| 2,769,739 | Flowers et al. | Nov. 6, 1956 |
| 2,834,770 | Kalkhoff | May 13, 1958 |